(12) United States Patent
Takahashi

(10) Patent No.: US 6,206,064 B1
(45) Date of Patent: Mar. 27, 2001

(54) PNEUMATIC TIRE HAVING DIRECTIONAL TREAD PATTERN

(75) Inventor: Ichiro Takahashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/056,823

(22) Filed: Apr. 8, 1998

(30) Foreign Application Priority Data

Apr. 10, 1997 (JP) .................................................. 9-092318

(51) Int. Cl.$^7$ ........................... B60C 11/13; B60C 115/00
(52) U.S. Cl. ................... 152/209.24; 152/209.28
(58) Field of Search ........................... 152/209.24, 209.28

(56) References Cited

U.S. PATENT DOCUMENTS

| | | | |
|---|---|---|---|
| 3,768,535 | * 10/1973 | Holden | 152/209.24 |
| 4,284,115 | * 8/1981 | Ohnishi | 152/209.24 |
| 4,832,099 | * 5/1989 | Matsumoto | 152/209.28 |
| 5,044,414 | * 9/1991 | Ushikubo | 152/209.24 |
| 5,127,455 | * 7/1992 | Remick | 152/209.24 |
| 5,297,604 | * 3/1994 | Lurois | 152/209.24 |

FOREIGN PATENT DOCUMENTS

| | | |
|---|---|---|
| 613719A1 | * 9/1994 | (EP) . |
| 613795A1 | * 9/1994 | (EP) . |
| 613795B1 | * 9/1994 | (EP) . |
| 0 688 685 A2 | 12/1995 | (EP) . |
| 0 816 130 A1 | 1/1998 | (EP) . |
| 61-60307 | * 3/1986 | (JP) . |
| 61-60308 | * 3/1986 | (JP) . |
| 61-200007 | * 9/1986 | (JP) . |
| 7-246806 | * 9/1995 | (JP) . |

OTHER PUBLICATIONS

Translation for Japan 61–60307.*
Patent Abstracts of Japan, vol. 010, No. 222 (M–504), Aug. 2, 1986 & JP 61 060307 A (Sumitomo Rubber Ind Ltd.), Mar. 28, 1986.
Patent Abstracts of Japan, vol. 096, No. 001, Jan. 31, 1996 & JP 07 246806 A (Sumitomo Rubber Ind Ltd.), Sep. 26, 1995.
Patent Abstracts of Japan, vol. 011, No. 028 (M–557), Jan. 27, 1987 & JP 61 200007 A (Bridgestone Corp), Sep. 4, 1986.
Patent Abstracts of Japan, vol. 010, No. 222 (M–504), Aug. 2, 1986 & JP 61 060308 A (Sumitomo Rubber Ind Ltd.), Mar. 28, 1986.

* cited by examiner

*Primary Examiner*—Steven D. Maki
(74) *Attorney, Agent, or Firm*—Sughrue, Mion, Zinn, Macpeak & Seas, PLLC

(57) ABSTRACT

At a portion of an inclined main groove from a tread center to an auxiliary groove of a pneumatic tire, an angle of inclination θ1 of a groove wall surface at a block step-in end side is set to be smaller than an angle of inclination θ2 of a groove wall surface at a block kick-out end side. Therefore, rigidity of step-in ends of blocks defined by inclined main grooves is lowered such that a striking sound can be reduced. Further, at a portion of the inclined main groove from the auxiliary groove to a tread end, an angle of inclination θ1 of a groove wall surface at a block step-in end side is set to be greater than an angle of inclination θ2 of a groove wall surface at a block kick-out end side. Therefore, rigidity of kick-out end sides of blocks defined by the inclined main grooves is lowered. Heel-and-toe wear which occurs at the kick-out end sides is suppressed, and an increase in pattern noise caused by heel-and-toe wear is suppressed.

18 Claims, 2 Drawing Sheets

PNEUMATIC TIRE HAVING DIRECTIONAL TREAD PATTERN

BACKGROUND OF THE INVENTION

1. Field of the Invention

The present invention relates to a pneumatic tire having inclined grooves at the tread, and in particular, to a pneumatic tire in which both wet properties are improved and pattern noise is reduced.

2. Description of the Related Art

In the field of pneumatic tires, there is an increasing number of examples of pneumatic tires utilizing an inclined main groove pattern in order to achieve both wet properties and a reduction in pattern noise.

However, in such conventional pneumatic tires, it is easy for uneven wear to occur at the blocks which are defined by the inclined main grooves in vicinities of the end portions of the tread. When the tire is new, both wet properties and low pattern noise are achieved, but as uneven wear occurs, the pattern noise worsens.

Further, after the tire becomes worn, the superior reduction in pattern noise which the tire exhibits over a conventional straight pattern tire disappears, and in some cases, the conventional tire may even be superior with regard to reducing pattern noise.

SUMMARY OF THE INVENTION

In view of the aforementioned, an object of the present invention is to provide a pneumatic tire which aims to achieve both wet properties and reduced pattern noise, and in which uneven wear of blocks at the tread end portion sides of an inclined groove pattern is improved, and in which pattern noise at the time of wear is also improved.

A first aspect of the present invention is a pneumatic tire in which a plurality of inclined main grooves are disposed in a tire circumferential direction from positions spaced apart from one another at both sides of a tire equatorial plane toward tread end sides so as to extend in opposite directions at either side of the tire equatorial plane and so as to be inclined with respect to the tire circumferential direction, wherein each of said inclined main grooves extends at an angle of inclination of 15 to 45° with respect to the tire circumferential direction; at a vicinity of a tread end side final end, each of said inclined main grooves extends at an angle of inclination of 75 to 105° with respect to the tire circumferential direction, and opens with a narrow width at a tread end; at a vicinity of a tire equatorial plane side final end, each of said inclined main grooves extends, in a circular-arc-shape convex toward a tire equatorial plane side, toward an intermediate portion of an inclined main groove which is adjacent in the tire circumferential direction, so as to open at the adjacent inclined main groove; at a tread side region, said inclined main grooves which are aligned in the tire circumferential direction are communicated by auxiliary grooves which are more narrow than said inclined main grooves; a rib which is continuous along the tire circumferential direction is defined on a tire equatorial plane, and a plurality of blocks which are aligned in the tire circumferential direction are defined at both sides of the rib; and given that an angle of inclination of a groove wall surface of said inclined main groove at a block step-in end side with respect to a normal line which passes through an opening end and is perpendicular to a tread stepping surface is $\theta_1$ and an angle of inclination of a groove wall surface of said inclined main groove at a block kick-out end side with respect to a normal line which passes through an opening end and is perpendicular to the tread stepping surface is $\theta_2$, $\theta_1 < \theta_2$ from a tread center to said auxiliary groove and $\theta_1 > \theta_2$ from said auxiliary groove to the tread end.

The operation of the pneumatic tire of the first aspect of the present invention will be described hereinafter.

First, operation relating to the water-removing ability will be discussed.

On a wet road surface, water within the tread stepping surface behaves as follows. At the vicinity of the step-in side of the tread stepping surface, in the vicinity of the tread center region, water flows forward in the tire circumferential direction or forward at less than 20° with respect to the tire circumferential direction. Next, at the tread intermediate region, water flows forward at 20 to 40° with respect to the tire circumferential direction. At the tread side region, water flows toward the outer side of the tire at an angle exceeding 40° with respect to the tire circumferential direction.

In the pneumatic tire of the first aspect of the present invention, the tread stepping surface is sectioned by inclined main grooves as follows. At the tread intermediate region, the inclined main groove extends at an angle of inclination of 15 to 45° with respect to the tire circumferential direction. At the final end of the inclined main groove which final end extends toward the tread center region, the inclined main groove extends in a circular-arc-shape, i.e., the inclination thereof with respect to the tire circumferential direction is small. At the final end of the inclined main groove which final end extends toward the tread end side, the inclined main groove extends substantially along the tread transverse direction, i.e., the inclination thereof with respect to the tire circumferential direction is large. The inclined main groove thus extends in directions coinciding with the above-described behavior of water within the tread stepping surface. Thus, an excellent water-removing ability is ensured.

Next, operation with respect to the pattern noise will be discussed.

An example of pattern noise of a tire is the striking sound made at the time of step-in of the block.

In the pneumatic tire of the first aspect of the present invention, at the portion of the inclined main groove from the tread center to the auxiliary groove, the angle of inclination $\theta_1$ of the groove wall surface at the block step-in end side is set to be smaller than the angle of inclination $\theta_2$ of the groove wall surface at the block kick-out end side. Therefore, at the blocks which are defined by the inclined main grooves from the tread center to the auxiliary grooves, the rigidity of the step-in end side is less than the rigidity of the kick-out end side.

In this way, because the rigidity of the step-in end of the block is smaller, the impact at the time of step-in of the block when the pneumatic tire is rolling can be lessened, and the striking sound can be decreased.

If the tread is divided into a tread central region at the tread center side and tread side regions positioned at the both sides of the central region, the tread central region (about the same as the region from the tread center to the auxiliary grooves) is a region at which there is no uneven wear of the blocks. Therefore, due to the aforementioned decrease in the striking sound at the time of step-in, pattern noise can be reduced over the entire lifetime of the tire.

From the auxiliary grooves to the tread ends, the angle of inclination $\theta_1$ of the block step-in end side groove wall surface is greater than the angle of inclination $\theta_2$ of the block kick-out end side groove wall surface. Therefore, at the blocks which are defined by the inclined main grooves from the auxiliary grooves to the tread ends, the rigidity of the kick-out end side is lower than the rigidity of the step-in end side.

It is easy for uneven wear to occur at the blocks at the regions at the tread end sides of the tread, i.e., the blocks at the tread side regions. (Uneven wear is wear in which the kick-out end side of the block is worn, and is also called heel-and-toe wear.) It is known that when uneven wear occurs, pattern noise increases.

While the tire is rolling, the blocks deform as they contact the road surface, and return to their original shapes as they move apart from the road surface. Heel-and-toe wear is wear which occurs at the time the block moves apart from the road surface, i.e., due to the sliding at the time of kick-out from the road surface.

In the pneumatic tire of the first aspect of the present invention, at the blocks which are defined by the portions of the inclined main grooves from the auxiliary grooves to the tread ends, the rigidity of the block kick-out end side is set to be low. As a result, the energy at the time of deformation of the kick-out end is decreased. Therefore, the sliding at the time of kick-out is decreased, uneven wear can be suppressed, and an increase in pattern noise caused by uneven wear can be suppressed.

In accordance with a second aspect of the invention, in the pneumatic tire of the first aspect, at a portion of the inclined main groove from the tread center to said auxiliary groove, an angle of inclination $\theta 1$ of a groove wall surface of a block step-in end side is 0 to 5° and an angle of inclination $\theta 2$ of a groove wall surface at a block kick-out end side is 8 to 20°, and at a portion of said inclined main groove from said auxiliary groove to the tread end, an angle of inclination $\theta 1$ of a groove wall surface of at a block step-in end side is 8 to 15° and an angle of inclination $\theta 2$ of a groove wall surface at a block kick-out end side is 0 to 5°.

In the pneumatic tire of the second aspect of the present invention, at the portion of the inclined main groove from the tread center to the auxiliary groove, the angle of inclination $\theta 1$ of the groove wall surface at the block step-in end side is set to be 0° to 5°. In this way, at a block defined by this portion of the inclined main groove, the rigidity of the step-in end side can be maintained low, and the striking sound can be sufficiently and reliably reduced.

Here, when the angle of inclination $\theta 1$ of the block step-in end side at the portion of the inclined main groove from the tread center to the auxiliary groove is less than 0° (i.e., when the groove wall surface is inclined toward the opposite side such that an inverse taper is formed), a convex portion of a mold for forming the inclined main groove gets caught at the time of removing the tire from the mold, and it is difficult to remove the tire from the mold.

On the other hand, when the angle of inclination $\theta 1$ of the block step-in end side at the portion of the inclined main groove from the tread center to the auxiliary groove is greater than 5°, the rigidity of the block increases, and therefore, the reduction in the striking sound is insufficient.

When the angle of inclination $\theta 2$ of the kick-out side groove wall surface at the portion of the inclined main groove from the tread center to the auxiliary groove is less than 8°, the rigidity of the kick-out end side of the block decreases, and operational stability deteriorates.

Further, when the angle of inclination $\theta 2$ of the kick-out side groove wall surface at the portion of the inclined main groove from the auxiliary groove to the tread end is greater than 20°, the cross-sectional area of the groove is small, and the water-removing ability deteriorates.

When the angle of inclination $\theta 1$ of the block step-in end side at the portion of the inclined main groove from the auxiliary groove to the tread end is less than 8°, the rigidity of the step-in side decreases and the wear at the time of step-in decreases. Thus, there is a relatively large amount of wear at the kick-out side, and it is easy for uneven wear to occur.

Further, when the angle of inclination $\theta 1$ of the block step-in end side at the portion of the inclined main groove from the auxiliary groove to the tread end is greater than 15°, the cross-sectional area of the groove is small, and the water-removing ability deteriorates.

When the angle of inclination $\theta 2$ of the block kick-out end side at the portion of the inclined main groove from the auxiliary groove to the tread end is less than 0° (i.e., when the groove wall surface is inclined toward the opposite side such that an inverse taper is formed), a convex portion of a mold for forming the inclined main groove gets caught at the time of removing the tire from the mold, and it is difficult to remove the tire from the mold.

On the other hand, when the angle of inclination $\theta 2$ of the block kick-out end side at the portion of the inclined main groove from the auxiliary groove to the tread end is greater than 5°, the rigidity becomes large, and it is easy for uneven wear to occur. Therefore, the difference in heights of adjacent blocks becomes large, and the striking sound at the time of step-in increases.

DESCRIPTION OF THE PREFERRED EMBODIMENT

An embodiment of a pneumatic tire of the present invention will be described hereinafter with reference to FIGS. 1 through 3.

The fundamental structure of a pneumatic tire 10 relating to the present invention is as follows. A pair of sidewall portions and a crown portion connected to the sidewall portions are reinforced by a radial structure carcass which is formed from plies of cords wound about and fixed to bead cores which are embedded in bead portions of the inner peripheral edges of the sidewall portions. Belts, which are plural layers of intersecting laminar bodies of cords disposed parallel to one another and which intersect the circumferential direction at small angles, are disposed at the periphery of the crown portion, and reinforce the tread disposed at the crown portion.

Figure 1:
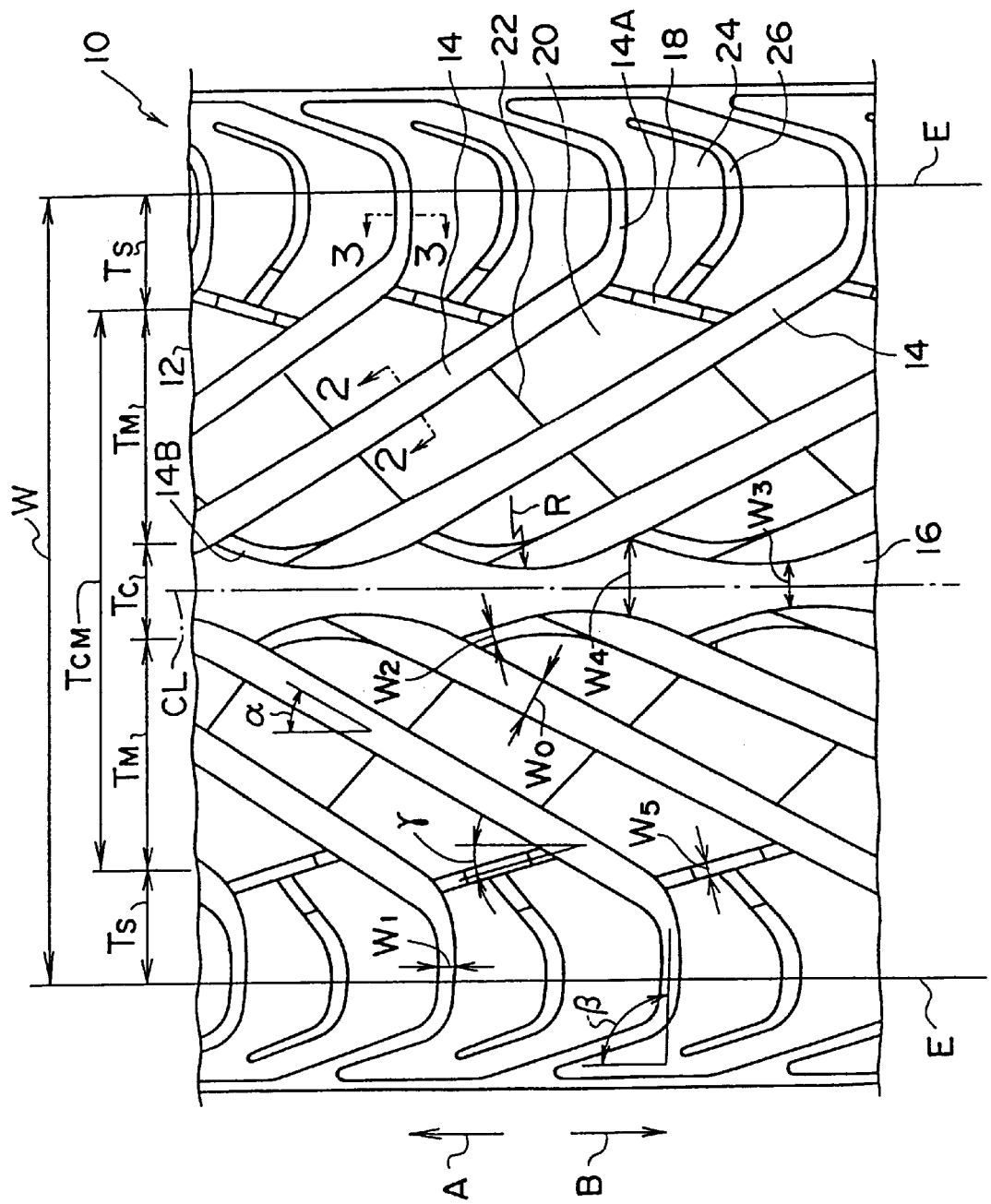
FIG. 1 illustrates a tread pattern of a pneumatic tire relating to an embodiment of the present invention.

FIG. 1 is a plan view of a tread 12 of the pneumatic tire 10. E are the tread ends, TC is the tread center region which accounts for 5 to 15% of the tread stepping surface width W and whose center is a tire equatorial plane CL, TM are tread intermediate regions which account for 20–40% of the tread stepping surface width W and are disposed at either side of the tread center region TC, and TS are tread side regions which are disposed between the tread intermediate regions TM and the tread ends E.

Hereinafter, the region collectively including the tread center region TC and the tread intermediate regions TM will be referred to as the tread central region TCM.

At the tread 12, a plurality of inclined grooves 14, which are disposed alternately at both sides of the tire equatorial plane CL, are aligned along the tire circumferential direction (the direction of arrow A and the direction of arrow B).

The inclined main grooves 14 are inclined to gradually move away from the tire equatorial plane CL along the direction of arrow B.

The inclined main grooves 14 extend in opposite directions at an angle of inclination α of 15 to 45°, more preferably 20 to 40°, toward the tread end E sides from positions which are spaced apart from each other by predetermined distances at the both sides of the tire equatorial plane CL. A final end region 14A, which extends at a vicinity of the final end at the tread end E side, more specifically, at the tread side region TS, extends at an angle of inclination β of 75 to 105° with respect to the circumferential direction of the tire, and opens with a narrow width at the tread end E. A final end region 14B, which extends at a vicinity of the final end at the tire equatorial plane CL side, more specifically, at the tread center region TC, extends in a circular-arc shape, which is convex toward the tire equatorial plane CL side, toward the tread intermediate region TM of the inclined main groove 14 which is adjacent to the final end region 14B in the circumferential direction of the tire, and opens at the adjacent inclined main groove 14. In this way, a rib 16, which is continuous in the tire circumferential direction, is defined on the equatorial plane CL of the tire.

At each final end region 14A sides, the inclined main grooves 14 which are aligned along the circumferential direction of the tire are communicated by auxiliary grooves 18, which are narrower than the inclined main grooves 14 and which extend at an angle of inclination γ of 25° or less with respect to the tire circumferential direction. In this way, a plurality of blocks 20, which are aligned along the circumferential direction of the tire, are defined at both sides of the rib 16.

In the illustrated example, the auxiliary grooves 18 are disposed in vicinities of the borders between the tread intermediate regions TM and the tread side regions TS.

The block 20 is divided into a plurality of sections by sipes 22 which extend to be oriented similarly to the auxiliary groove 18 adjacent to the block 20, and preferably in directions substantially orthogonal to the inclined main groove 14. In the illustrated example, the block 20 is divided into three sections by two sipes 22.

At the tread end region TS, side portion blocks 24 are defined at the final end regions 14A of the inclined main grooves 14 which are aligned in the tire circumferential direction, the auxiliary grooves 18, and the tread ends E. The side portion block 24 has a cut-out groove 26 which extends from the tread end E.

It is preferable that the inclined main groove 14 has a depth of 5 to 10 mm, the width W0 thereof at the tread intermediate region TM is 3–7% of the tread stepping surface width W, the opening width W1 of the final end region 14A at the tread end E is 1 to 4% of the tread stepping surface width W, and the opening width W2 of the final end region 14B at the end near the adjacent inclined main groove 14 is 1 to 4% of the tread stepping surface width W.

Further, the radius of curvature R of the final end 14B forming a circular-arc shape at the tire equatorial plane CL side is optimally 30 to 150 mm. The rib 16 which is interposed between and defined by these final end regions 14B has a maximum width W4 of 5 to 15% of the tread stepping surface width W and a minimum width W3 of 3 to 12% of the tread stepping surface width W, to form a land portion which extends in a zigzag shape in the tire circumferential direction.

It is preferable to form the auxiliary groove 18 to have a width W5 of 1 to 3% of the stepping surface width W and a depth of 4 to 7 mm. It is preferable to form the cut-out groove 26, which is formed in order to optimize the rigidity in the vicinity of the tread end E, to have a width which depends on the opening of the final end region 14A.

The width of the sipe 22 is of an extent which closes during ground-contact accompanying the load rolling, and more specifically, is about 0.5 to 3 mm.

Figure 2:
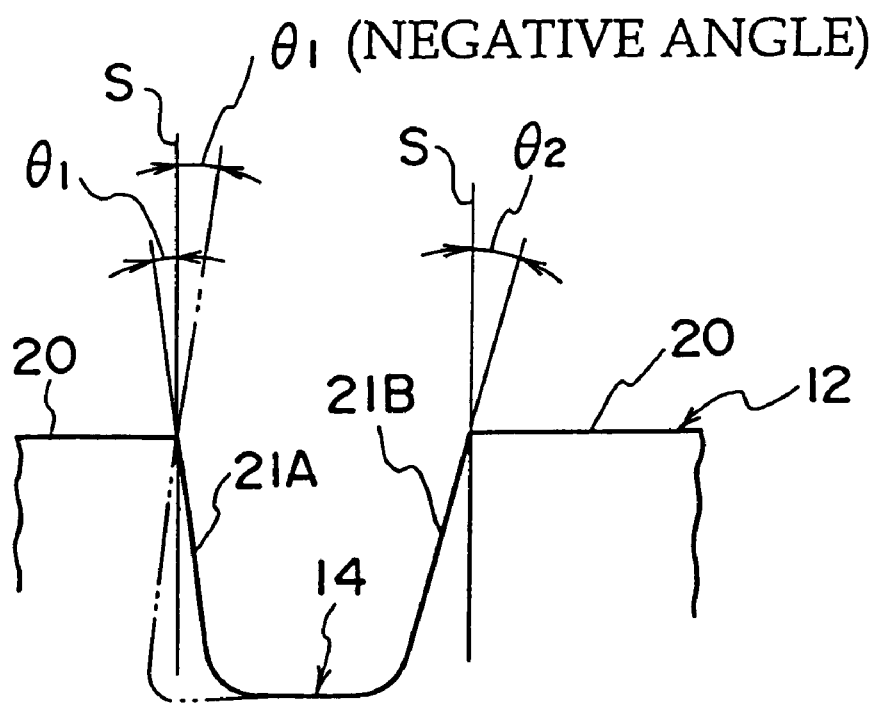
FIG. 2 is a cross-sectional view, taken along line 2—2 of FIG. 1, of a portion of an inclined main groove at a tread central region.

As illustrated in FIGS. 1 and 2, at the portion of the inclined main groove 14 from the tire equatorial plane CL to the auxiliary groove 18, when a cross-section of the inclined main groove 14 is taken orthogonal to the center line of the groove, an angle of inclination θ of a groove wall surface with respect to a vertical line S, which is 90° with respect to a ground-contacting surface 12A and which passes through the opening end of the inclined main groove 14, is set to be smaller for a groove wall surface 21A at the arrow A direction side of the block 20 than a groove wall surface 21B at the arrow B direction side of the block 20.

At the portion of the inclined main groove 14 from the tire equatorial plane CL to the auxiliary groove 18, the angle of inclination θ1 of the groove wall surface 21A is preferably 0 to 5°, and the angle of inclination θ2 of the groove wall surface 21B is preferably 8 to 20°.

Figure 3:
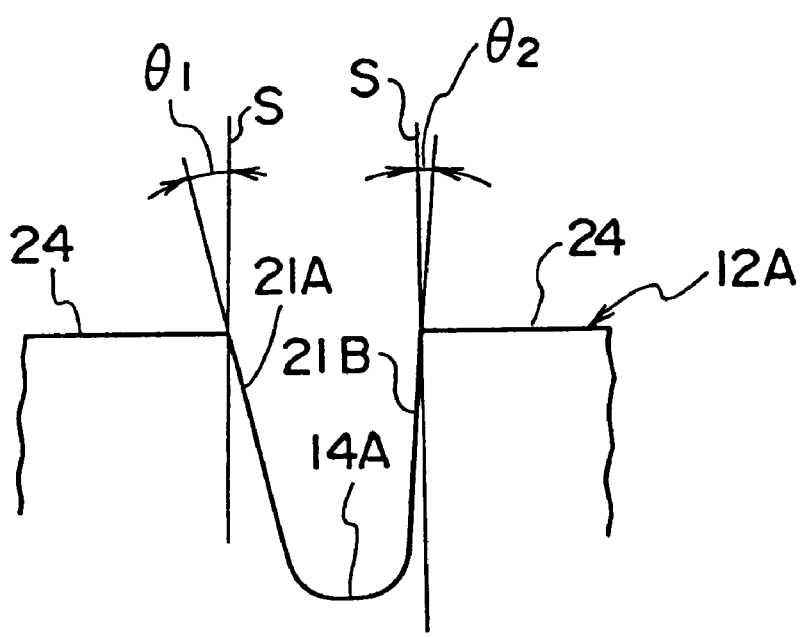
FIG. 3 is a cross-sectional view, taken along line 3—3 of FIG. 1, of a portion of an inclined main groove at a tread side region.

Further, at the portion of the inclined main groove 14 from the auxiliary groove 18 to the tread end E, as illustrated in FIG. 3, the angle of inclination θ2 of the groove wall surface 21B is set to be smaller than the angle of inclination θ1 of the groove wall surface 21A. The angle of inclination θ1 of the groove wall surface 21A is preferably 8 to 15°, and the angle of inclination θ2 of the groove wall surface 21B is preferably 0 to 5°.

At the pneumatic tire 10 whose tread 12 is sectioned by the arrangement of grooves described above, the negative ratio of the entire tread stepping surface portion is 25–35%, and the negative ratio at the respective transverse direction positions of the tread stepping surface portion is a maximum at the regions adjacent the rib 16, and gradually decreases from there toward the tread end E sides. More preferably, at a region at which there is a negative ratio of the entire tread stepping surface of 70% or more, e.g., at a region which occupies 70 to 90% of the tread stepping surface width W at the tread central portion side, the negative ratio of the tread side regions TS within that region is 50 to 80% of the maximum negative ratio, and the negative ratio at portions of the tread end E sides other than that region is 15 to 30% of the maximum negative ratio.

The operation of the pneumatic tire 10 of the present embodiment will be described hereinafter.

The pneumatic tire 10 is installed on a vehicle to rotate in the direction of arrow A in FIG. 1.

On a wet road surface, water within the tread stepping surface behaves as follows. At the vicinity of the step-in side of the tread stepping surface, in the vicinity of the tread center region TC, water flows forward in the tire circumferential direction or forward at less than 20° with respect to the tire circumferential direction. Next, at the tread intermediate region TM, water flows forward at 20 to 40° with respect to the tire circumferential direction. At the tread side region TS, water flows toward the outer side of the tire at an angle exceeding 40° with respect to the tire circumferential direction.

Accordingly, in the pneumatic tire 10, the tread stepping surface is sectioned by the inclined main grooves 14 as follows. At the tread intermediate region TM, the inclined main groove 14 extends at an angle of inclination of 15 to 45° with respect to the tire circumferential direction. At the final end 14B which extends toward the tread center region TC, the inclined main groove 14 extends in a circular-arc-shape, i.e., the inclination thereof with respect to the tire circumferential direction is small. At the final end 14A which extends toward the tread side region TS, the inclined main groove 14 extends substantially along the tread transverse direction, i.e., the inclination thereof with respect to the tire circumferential direction is large. The inclined main groove 14 thus extends in directions coinciding with the above-described behavior of water within the tread stepping surface. Thus, an excellent water-removing ability is ensured.

Here, when the angle of inclination α, with respect to the tire circumferential direction, of the inclined main groove 14 at the tread intermediate region TM is less than 15°, the rigidity required by the blocks 20 between the inclined main grooves 14 is not imparted, which leads to a deterioration in operational stability and the occurrence of uneven wear. In contrast, when the angle of inclination α exceeds 45°, the water-removing ability cannot be ensured.

Similarly, the reason why the angle of inclination β, with respect to the tire circumferential direction, of the final end 14A of the inclined main groove 14 at the tread side region TS is set to 75 to 105° is that, when the angle of inclination β is less than 75°, the traction is insufficient, whereas if the angle of inclination β is greater than 105°, uneven wear occurs.

The reason why the width of the inclined main groove 14 is large at the tread intermediate region TM and gradually decreases toward the both side ends is in order to vary the negative ratio as will be described in detail later.

Further, due to the rib 16 formed at the tread center region TC, the impact component of the tread center region TC which greatly affects pattern noise is suppressed, so that there is less noise.

Here, if the radius of curvature of the circular arc at the final end 14B region is too large, air-column resonance is generated in the same way as if the inclined main groove 14 were a straight groove extending in the circumferential direction. On the other hand, if the radius of curvature is too small, the rigidity of the rib 16 in a vicinity of the final end of the inclined main groove 14 becomes excessively low, and it is easy for uneven wear to occur. It is preferable for the radius of curvature of the circular arc at the final end 14B region to be 30 to 150 mm.

In particular, in the tread pattern of the present embodiment, the row of the final ends 14B forming the circular-arc shapes of the inclined main grooves 14 at the tread center region TC and the row of the auxiliary grooves 18 and portions of the inclined main grooves 14 at the tread side region TS each substantially form a groove which extends continuously in a zigzag shape substantially in the circumferential direction of the tire.

First, by substantially connecting the grooves in the tire circumferential direction, the water-removing ability can be improved even more.

Further, due to the grooves extending zigzag shapes in the circumferential direction of the tire, the vibration energy, which is caused by the impact with the road surface at the step-in end side of the block at the time the tire rotates, is absorbed at the side walls of the grooves, which is effective for the reduction of noise.

Moreover, the rigidity of the rib 16 and the blocks 20 defined by the grooves is optimized, such that operational stability is improved and uneven wear is avoided.

More specifically, by forming the zigzag-shaped grooves, the tread transverse direction positions of the low-rigidity portions are changed along the circumferential direction. Therefore, as compared with a case such as a case in which straight grooves are used and the low-rigidity portions are on the same circumference, a concentration of tread deformation at the low-rigidity portions in the transverse direction is suppressed, and the ground-contact pressure can be made uniform.

Further, in a case in which the grooves are formed straight, the corner portions of the blocks have more acute angles, which promotes uneven wear. However, by making the grooves zigzag, such uneven wear can be avoided.

Here, it is preferable for the opening position of the auxiliary groove 18 at the tread side region TS to be in a range of 50 to 85% of ½ of the width of the tread stepping surface portion, from the tire equatorial plane CL side to the tread end E.

The reason is that when the opening position is in a range exceeding 85%, the rigidity of the side portion block 24 decreases, which leads to insufficient traction and insufficient driving properties, and the operational stability deteriorates. On the other hand, if the opening position is in a range less than 50%, the desired ground-contact pressure distribution cannot be obtained.

A more preferable range is 60 to 75%. The auxiliary groove 18 divides the block between the inclined main grooves 14 into the block 20 at the tread central region TCM side and the side portion block 24 at the tread side region TS side, and the respective wears of the block end portions do not affect each other.

Similarly, the interval between the final ends 14B of the inclined main grooves 14 at the tread center region TC, which final ends 14B form the circular-arc-shapes which sandwich the tire equatorial plane CL, i.e., the maximum width of the rib 16, is preferably 10 to 30% of ½ of the width of the tread stepping surface portion.

The reason is that if the interval is less than 10%, the negative ratio of the tread center region TC becomes excessively large, and therefore, the operational stability and the linearity at the time of steering (the relationship between the steering angle and the steering force varying linearly) deteriorates. On the other hand, if the interval is greater than 30%, an improvement in the water-removing ability cannot be expected. A range of 7 to 13% is more preferable.

Moreover, the negative ratio of the tread stepping surface portion gradually decreases from the tread central portion toward the tread ends E. More specifically, observing the hydroplaning phenomenon, a water film is formed from the tread center region TC to the tread intermediate regions TM of the tread stepping surface portion. Therefore, the ratio of the negative ratio due to the inclined main grooves 14 formed from the tread center region TC to the tread intermediate regions TM, to the negative ratio of the entire stepping surface is sufficiently large, which contributes to the water-removing ability. The negative ratio is the largest at the both side end portions of the rib 16, and gradually decreases toward the tread end E sides.

Here, at the tread center region TC and the tread intermediate regions TM which are, for example, 70–90% of the tread stepping surface width and which take up 70% or more of the negative ratio of the entire tread stepping surface portion, by making the negative ratio at the tread end E side portions within this region to be 50 to 80% of the maximum negative ratio of the portions adjacent the rib 16, the water-removing ability improves. Further, rather than the regions at the tread intermediate region TM sides, the tread end E side portions are portions which have a greater effect on the operational stability than the water-removing ability. Therefore, in order to ensure the tread rigidity, the negative ratio of these portions is set to 15 to 30% of the maximum negative ratio, so that the operational stability improves.

Next, the noise decreasing operation of the pneumatic tire 10 will be described.

The tread central region TCM of the tread 12 is a region at which uneven wear is not generated. Accordingly, as in the present embodiment, at the portion of the inclined main groove 14 from the tire equatorial plane CL to the auxiliary groove 18, the angle of inclination θ1 of the groove wall surface 21A at the block step-in end side is 0 to 5°, and the rigidity at the step-in end side portion of the block 20 is decreased. In this way, the striking sound at the time the step-in side end portion of the block 20 abuts the road surface can be reduced over the entire lifetime of the tire.

The tread side region TS side, i.e., the side portion block 24 of the present embodiment, is a region at which it is easy for uneven wear to occur.

However, in the pneumatic tire 10 of the present embodiment, at the portion of the inclined main groove 14 from the auxiliary groove 18 to the tread end E, the angle of inclination θ2 of the groove wall surface 21B at the block kick-out end side is 0 to 5° and the rigidity at the kick-out side end portion of the block 24 is reduced. In this way, uneven wear which occurs easily at the kick-out end of the block 24 can be suppressed, and a worsening of pattern noise which is caused by uneven wear can be suppressed.

EXPERIMENTAL EXAMPLE

Experimental Example Tires were filled to an internal pressure of 2.5 kg/cm², were installed on an actual vehicle (a European middle class sedan) carrying a load of two occupants, and the water-removing ability, pattern noise, pattern noise of the worn tire, and operational stability were tested.

The tires (tire size 225/45ZR17) used for the Comparative Examples 1, 2 and the Example all had the same tread pattern (the tread pattern of FIG. 1), but the angles of inclination of the groove wall surfaces of the inclined main grooves were varied as shown in Table 1.

The testing methods were as follows.
1. Water-Removing Ability: The vehicle traveled on a propulsion 10 mm wet road surface, and the speed at which hydroplaning occurred was measured.
2. Pattern Noise: A microphone was placed at the position of the ear of the driver, and the noise at the time the vehicle traveled at 60 km/h on a straight, flat road was measured.
3. Pattern Noise of the Worn Tire: After the tire had traveled on general roads for 5000 km, the noise was measured under the same conditions as those of the above-described pattern noise measuring method.
4. Operational Stability: Operational stability was evaluated by the feelings of a test driver when the vehicle traveled in various running modes on a 50 m radius dry circuit.

In following Table 1, all of the results of evaluation are listed with the results of Comparative Example 1 being an index of 100. The greater the values, the better the characteristics.

TABLE 1

| | | | Comparative Example Tire 1 | Comparative Example Tire 2 | Example Tire |
|---|---|---|---|---|---|
| Angle of Groove Wall Surface of Inclined Main Groove | Central Region | Step-In End Side | 7° | 3° | 3° |
| | | Kick-Out End Side | 7° | 10° | 10° |
| | Side Region | Step-In End Side | 7° | 10° | 10° |
| | | Kick-Out End Side | 7° | 3° | 3° |
| Auxiliary Grooves | | | Yes | No | Yes |
| Water-Removing Ability | | | 100 | 100 | 100 |
| Pattern Noise | | | 100 | 103 | 103 |
| Pattern Noise of Worn Tire | | | 100 | 101 | 105 |
| Operational Stability | | | 100 | 97 | 100 |

As can be seen from the experimental results listed in Table 1, the Example Tire to which the present invention was applied had less pattern noise after wear than Comparative Example Tires 1 and 2, and worsening of the pattern noise was suppressed. Further, there was no deterioration in the other properties of the Example Tire.

What is claimed is:
1. A pneumatic tire in which a plurality of inclined main grooves are disposed in a tire circumferential direction from positions spaced apart from one another at both sides of a tire equatorial plane toward tread end sides so as to extend in opposite directions at either side of the tire equatorial plane and so as to be inclined with respect to the tire circumferential direction, wherein from a tire equatorial plane side to a vicinity of a tread end side, each of said inclined main grooves extends at a first angle of inclination with respect to the tire circumferential direction, at a vicinity of a tread end side final end, each of said inclined main grooves extends at a second angle of inclination with respect to the tire circumferential direction, which second angle of inclination is greater than the first angle of inclination, and opens with a narrow width at a tread end, at a vicinity of a tire equatorial plane side final end, each of said inclined main grooves extends, in a circular-arc-shape convex toward a tire equatorial plane side, toward an intermediate portion of an inclined main groove which is adjacent in the tire circumferential direction, so as to open at the adjacent inclined main groove, at a tread side region, said inclined main grooves which are aligned in the tire circumferential direction are communicated by auxiliary grooves which are more narrow than said inclined main grooves, a rib which is continuous along the tire circumferential direction is defined on a tire equatorial plane, and a plurality of blocks which are aligned in the tire circumferential direction are defined at both sides of the rib, and at each of said blocks which are disposed from a tread center to said auxiliary grooves, a rigidity of a step-in end of said block is set to be lower than a rigidity of a kick-out end of said block, and at each of said blocks which are disposed from said auxiliary grooves to tread ends, a rigidity of a kick-out end of said block is set to be lower than a rigidity of a step-in end of said block.

2. A pneumatic tire according to claim 1, wherein an angle of inclination θ1 of a groove wall surface of a portion of said inclined main groove with respect to a normal line which passes through an opening end of said inclined main groove and is perpendicular to a tread stepping surface from the tread center to said auxiliary groove at a block step-in end side is 0 to 5°.

3. A pneumatic tire according to claim 1, wherein an angle of inclination of θ2 of a groove wall surface of a portion of said inclined main groove with respect to a normal line which passes through an opening end of said inclined main groove and is perpendicular to a tread stepping surface from said auxiliary groove to the tread end at a block kick-out end side is 0 to 5°.

4. A pneumatic tire according to claim 1, wherein an angle of inclination θ2 of a groove wall surface of a portion of said inclined main groove with respect to a normal line which passes through an opening end of said inclined main groove and is perpendicular to a tread stepping surface from the tread center to said auxiliary groove at a block kick-out end side is 8 to 20°.

5. A pneumatic tire according to claim 1, wherein an angle of inclination $f1$ of a groove wall surface of a portion of said inclined main groove with respect to a normal line which passes through an opening end of said inclined main groove and is perpendicular to a tread stepping surface from said auxiliary groove to the tread end at a block step-in end side is 8 to 15°.

6. A pneumatic tire according to claim 1, wherein at a portion of said inclined main groove from the tread center to said auxiliary groove, an angle of inclination θ1 of a groove wall surface of a block step-in end side with respect to a normal line which passes through an opening end of said inclined main groove and is perpendicular to a tread stepping surface is 0 to 5° and an angle of inclination θ2 of a groove wall surface at a block kick-out end side with respect to a normal line which passes through an opening end of said inclined main groove and is perpendicular to the tread stepping surface is 8 to 20°, and at a portion of said inclined main groove from said auxiliary groove to the tread end, an angle of inclination θ1 of a groove wall surface of at a block step-in end side with respect to a normal line which passes through an opening end of said inclined main groove and is perpendicular to the tread stepping surface is 8 to 15° and an angle of inclination θ2 of a groove wall surface at a block kick-out end side with respect to a normal line which passes through an opening end of said inclined main groove and is perpendicular to the tread stepping surface is 0 to 5°.

7. A pneumatic tire in which a plurality of inclined main grooves are disposed in a tire circumferential direction from positions spaced apart from one another at both sides of a tire equatorial plane toward tread end sides so as to extend in opposite directions at either side of the tire equatorial plane and so as to be inclined with respect to the tire circumferential direction, wherein from a tire equatorial plane side to a vicinity of a tread end side, each of said inclined main grooves extends at an angle of inclination of 15 to 45° with respect to the tire circumferential direction, at a vicinity of a tread end side final end, each of said inclined main grooves extends at an angle of inclination of 75 to 105° with respect to the tire circumferential direction, and opens with a narrow width at a tread end, at a vicinity of a tire equatorial plane side final end, each of said inclined main grooves extends, in a circular-arc-shape convex toward a tire equatorial plane side, toward an intermediate portion of an inclined main groove which is adjacent in the tire circumferential direction, so as to open at the adjacent inclined main groove, at a tread side region, said inclined main grooves which are aligned in the tire circumferential direction are communicated by auxiliary grooves which are more narrow than said inclined main grooves, a rib which is continuous along the tire circumferential direction is defined on a tire equatorial plane, and a plurality of blocks which are aligned in the tire circumferential direction are defined at both sides of the rib, and at each of said blocks which are disposed from a tread center to said auxiliary grooves, a rigidity of a step-in end of said block is set to be lower than a rigidity of a kick-out end of said block, and at each of said blocks which are disposed from said auxiliary grooves to tread ends, a rigidity of a kick-out end of said block is set to be lower than a rigidity of a step-in end of said block.

8. A pneumatic tire according to claim 7, wherein an angle of inclination θ1 of a groove wall surface of a portion of said inclined main groove with respect to a normal line which passes through an opening end of said inclined main groove and is perpendicular to a tread stepping surface from the tread center to said auxiliary groove at a block step-in end side is 0 to 5°.

9. A pneumatic tire according to claim 7, wherein an angle of inclination θ2 of a groove wall surface of a portion of said inclined main groove with respect to a normal line which passes through an opening end of said inclined main groove and is perpendicular to a tread stepping surface from said auxiliary groove to the tread end at a block kick-out end side is 0 to 5°.

10. A pneumatic tire according to claim 7, wherein an angel of inclination θ2 of a groove wall surface of a portion of said inclined main groove with respect to a normal line which passes through an opening end of said inclined main groove and is perpendicular to a tread stepping surface from the tread center to said auxiliary groove at a block kick-out end side is 8 to 20°.

11. A pneumatic tire according to claim 7, wherein an angle of inclination θ1 of a groove wall surface of a portion of said inclined main groove with respect to a normal line which passes through an opening end of said inclined main groove and is perpendicular to a tread stepping surface from said auxiliary groove to the tread end at a block step-in end side is 8 to 15°.

12. A pneumatic tire according to claim 7, wherein at a portion of said inclined main groove from the tread center to said auxiliary groove, an angle of inclination θ1 of a groove wall surface of a block step-in end side with respect to a normal line which passes through an opening end of said inclined main groove and is perpendicular to a tread stepping surface is 0 to 5° and an angle of inclination θ2 of a groove wall surface at a block kick-out end side with respect to a normal line which passes through an opening end of said inclined main groove and is perpendicular to the tread stepping surface is 8 to 20°, and at a portion of said inclined main groove from said auxiliary groove to the tread end, an angle of inclination θ1 of a grove wall surface of at a block step-in end side with respect to a normal line which passes through an opening end of said inclined main groove and is perpendicular to the tread stepping surface is 8 to 15° and an angle of inclination θ2 of a groove wall surface at a block kick-out end side with respect to a normal line which passes through an opening end of said inclined main groove and is perpendicular to the tread stepping surface is 0 to 5°.

13. A pneumatic tire in which a plurality of inclined main grooves are disposed in a tire circumferential direction from positions spaced apart from one another at both sides of a tire equatorial plane toward tread end sides so as to extend in opposite directions at either side of the tire equatorial plane and so as to be inclined with respect to the tire circumferential direction, wherein from a tire equatorial plane side to a vicinity of a tread end side, each of said inclined main grooves extends at an angle of inclination of 15 to 45° with respect to the tire circumferential direction, at a vicinity of a tread end side final end, each of said inclined main grooves extends at an angle of inclination of 75 to 105° with respect to the tire circumferential direction, and opens with a narrow width at a tread end, at a vicinity of a tire equatorial plane side final end, each of said inclined main grooves extends, in a circular-arc-shape convex toward a tire equatorial plane side, toward an intermediate portion of an inclined main groove which is adjacent in the tire circumferential direction, so as to open at the adjacent inclined main groove, at a tread side region, said inclined main grooves which are aligned in the tire circumferential direction are communicated by auxiliary grooves which are more narrow than said inclined main grooves, a rib which is continuous along the tire circumferential direction is defined on a tire equatorial plane, and a plurality of blocks which are aligned in the tire circumferential direction are defined at both sides of the rib, and given that an angle of inclination of a groove wall surface of said inclined main groove at a block step-in end side with respect to a normal line which passes through an opening end of said inclined main groove and is perpendicular to a tread stepping surface is θ1 and an angle of inclination of a groove wall surface of said inclined main groove at a block kick-out end side with respect to a normal line which passes through an opening end of said inclined main groove and is perpendicular to the tread stepping surface is θ2, θ1<θ2 from a tread center to said auxiliary groove and θ1>θ2 from said auxiliary groove to the tread end.

14. A pneumatic tire according to claim 13, wherein the angle of inclination θ1 of the groove wall surface of said inclined main groove from the tread center to said auxiliary groove at the block step-in end side is 0 to 5°.

15. A pneumatic tire according to claim 13, wherein the angle of inclination θ2 of the groove wall surface of said inclined main groove from said auxiliary groove to the tread end at the block kick-out end side is 0 to 5°.

16. A pneumatic tire according to claim 12, wherein the angle of inclination θ2 of the groove wall surface of said inclined main groove from the tread center to said auxiliary groove at the block kick-out end side is 8 to 20°.

17. A pneumatic tire according to claim 13, wherein the angle of inclination θ1 of the groove wall surface of said inclined main groove from said auxiliary groove to the tread end at the block step-in end side is 8 to 15°.

18. A pneumatic tire according to claim 13, wherein at said inclined main groove from the tread center to said auxiliary groove, the angle of inclination θ1 of the groove wall surface of the block step-in end side is 0 to 5° and the angle of inclination θ2 of the groove wall surface at the block kick-out end side is 8 to 20°, and at said inclined main groove from said auxiliary groove to the tread end, the angle of inclination θ1 of the groove wall surface of at the block step-in end side is 8 to 15° and the angle of inclination θ2 of the groove wall surface at a block kick-out end side is 0 to 5°.

* * * * *